Patented Sept. 29, 1931

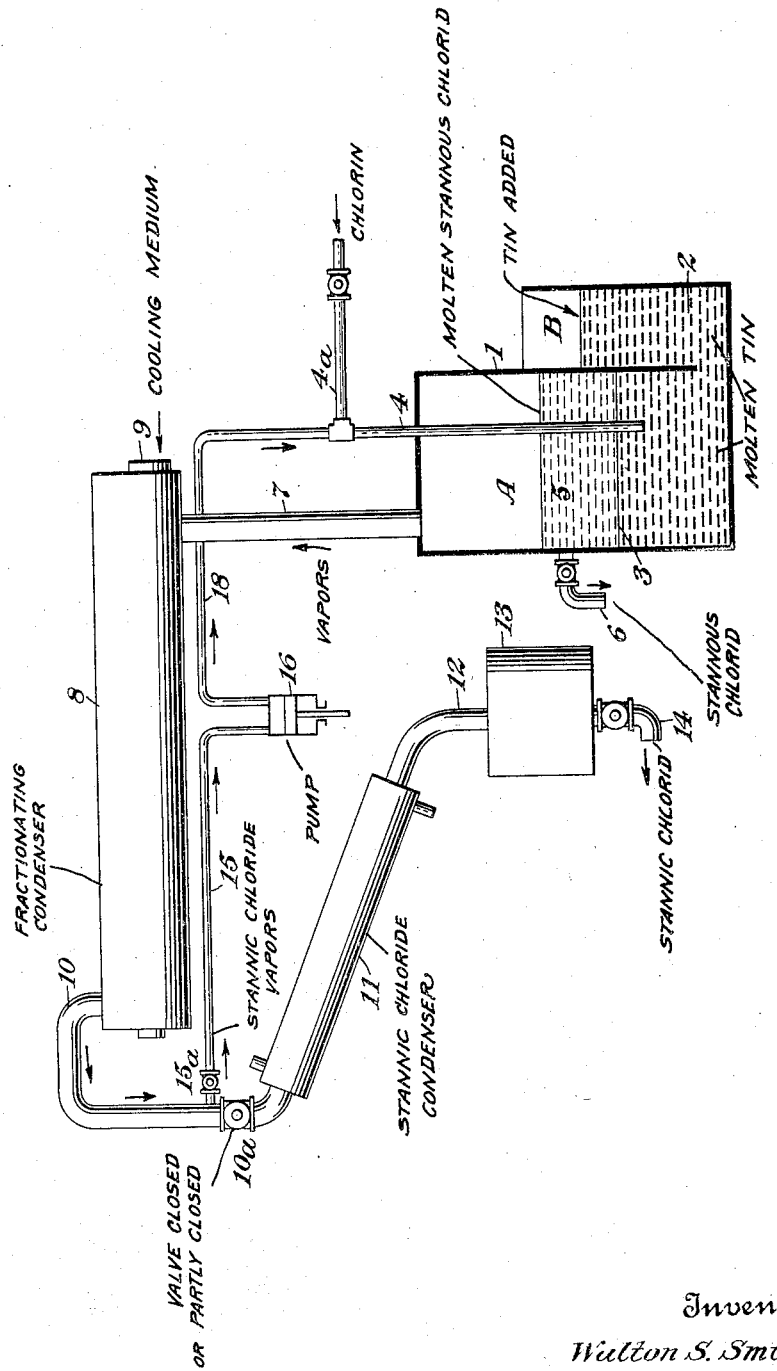

1,825,212

UNITED STATES PATENT OFFICE

WALTON S. SMITH, OF HILLSIDE, NEW JERSEY

PROCESS OF MAKING STANNOUS CHLORIDE

Application filed January 17, 1930. Serial No. 421,458.

This invention relates to making stannous chloride; and it comprises establishing and maintaining a molten bath of tin carrying a molten supernatant layer of stannous chloride and adding chlorin and molten tin to said bath while tapping off liquid stannous chloride, all in continuous operation; all as more fully hereinafter set forth and as claimed.

In another and copending application Ser. No. 199,740, now Patent No. 1,777,132, whereof the present application is a continuation in part, I have disclosed and claimed a continuous method of making tin chlorides without the danger incident to the usual discontinuous method wherein the reaction chamber must be opened from time to time to charge in metallic tin, it being difficult in so opening the chamber to prevent escape of chlorin and tin chloride vapor. In the method of the stated application replenishment is by molten tin delivered into the reaction chamber from an outside source and continuous operation becomes possible. In the acknowledged application I have specifically claimed the manufacture of stannic chloride. The present application more particularly relates to the manufacture of anhydrous stannous chloride.

Stannous chloride in water solution can be made by treating stannic chloride solution with tin or by dissolving tin in hydrochloric acid. There is, however, a demand for anhydrous stannous chloride and its manufacture offers more difficulty. It is the purpose of the present invention to provide a simple, cheap and ready method of producing anhydrous stannous chloride in continuous operation.

In the present invention I establish and maintain a replenished bath of molten tin with a supernatant layer of fused stannous chloride. Into the tin bath, I pass chlorin and to it I add replenishing tin as a molten liquid, addition being continuous or intermittent as the case may be. The feed of tin and of chlorin are in the proportions necessary for forming $SnCl_2$. The chlorin is introduced below the surface of the tin bath and it forms stannous chloride which rises and joins the supernatant molten layer of chloride. Fused stannous chloride is tapped off from this layer intermittently or continuously as circumstances may indicate. Stannic chloride being an extremely volatile body, any stannic chloride forming is a vapor ascending into the vapor space above the layer of stannous chloride. In practice I connect this vapor space with means adapted to return stannic chloride to the chlorin inlet. The returned stannic chloride is converted into stannous chloride by the tin of the bath.

In the accompanying illustration I have shown, more or less diagrammatically, an apparatus generally similar to that of the acknowledged application but modified so as to permit the manufacture at will of stannous chloride as a sole product. In the illustration the showing is partly in central vertical section and partly in elevation.

In the showing, element 1 is a reaction vessel which may be made of iron or other suitable material and provided with heating means (not shown). This vessel comprises a reaction chamber proper A and a feed well B; the two being in liquid communication through a port or opening 2 at their base. Both chambers are shown as containing molten tin. Replenishment of the material consumed in A is by the addition of molten tin or pig tin to B. Within the chamber A the molten tin assumes a liquid level which is indicated by 3. Beneath this liquid level passes chlorin introduction pipe 4 leading in chlorin from valved pipe $4^a$ from a source not shown. Above this layer of molten tin is a second molten layer 5 of stannous chloride.

At the top, chamber A communicates with vapor pipe 7 leading to precondenser 8 provided with cleaning manholes 9. Vapors pass from 8 through 10, and in the apparatus shown they may go into condenser 11, valve $10^a$ being opened for the condensation of stannic chloride, this stannic chloride going through 12 into reception vessel 13 provided with drawoff 14. When the manufacture of stannous chloride is the main object, as it is in the present invention, valve $10^a$ is closed and the vapors of stannic chloride pass through pipe 15, valved at 15ª, to pump 16 which sends them forward through 18 to a T-connection with the chlorin pipe 4ª. The vapors go forward with the chlorin and pass beneath the surface of the molten tin, thereby reducing the stannic chloride to stannous.

As will be noted, the apparatus may be run at will to make stannic chloride or stannous chloride, or any desired proportions of either. When the apparatus is being run to make stannous chloride, molten stannous chloride may be tapped off from time to time or continuously by the valved pipe 6.

What I claim is:

1. In the manufacture of stannous chloride, the process which comprises establishing and maintaining a bath of molten tin at a temperature above the melting point of stannous chloride and introducing chlorin into said bath at the rate only at which it is taken to form stannous chloride and thereby forming a floating layer of fused stannous chloride on the bath.

2. In the continuous manufacture of stannous chloride, the process which comprises establishing and maintaining a replenished bath of molten tin at a temperature above the melting point of stannous chloride, the replenishment being sufficient to keep the bath volume substantially constant, and introducing chlorin into said bath at the rate at which it is absorbed and tapping off molten stannous chloride from the floating layer forming.

3. In the continuous manufacture of stannous chloride, the process which comprises establishing and maintaining a replenished bath of molten tin at a temperature above the melting point of stannous chloride, the replenishment being sufficient to keep the bath volume substantially constant, introducing chlorin into said bath at the rate at which it is absorbed, tapping off molten stannous chloride from the floating layer forming and collecting any evolved vapors of stannic chloride and returning the same in admixture with the ingoing chlorin.

In testimony whereof, I affix my signature.

WALTON S. SMITH.